J. P. MULLER.
WATER HOISTING SYSTEM.
APPLICATION FILED SEPT. 15, 1913.
1,127,490.
Patented Feb. 9, 1915.
4 SHEETS—SHEET 3.
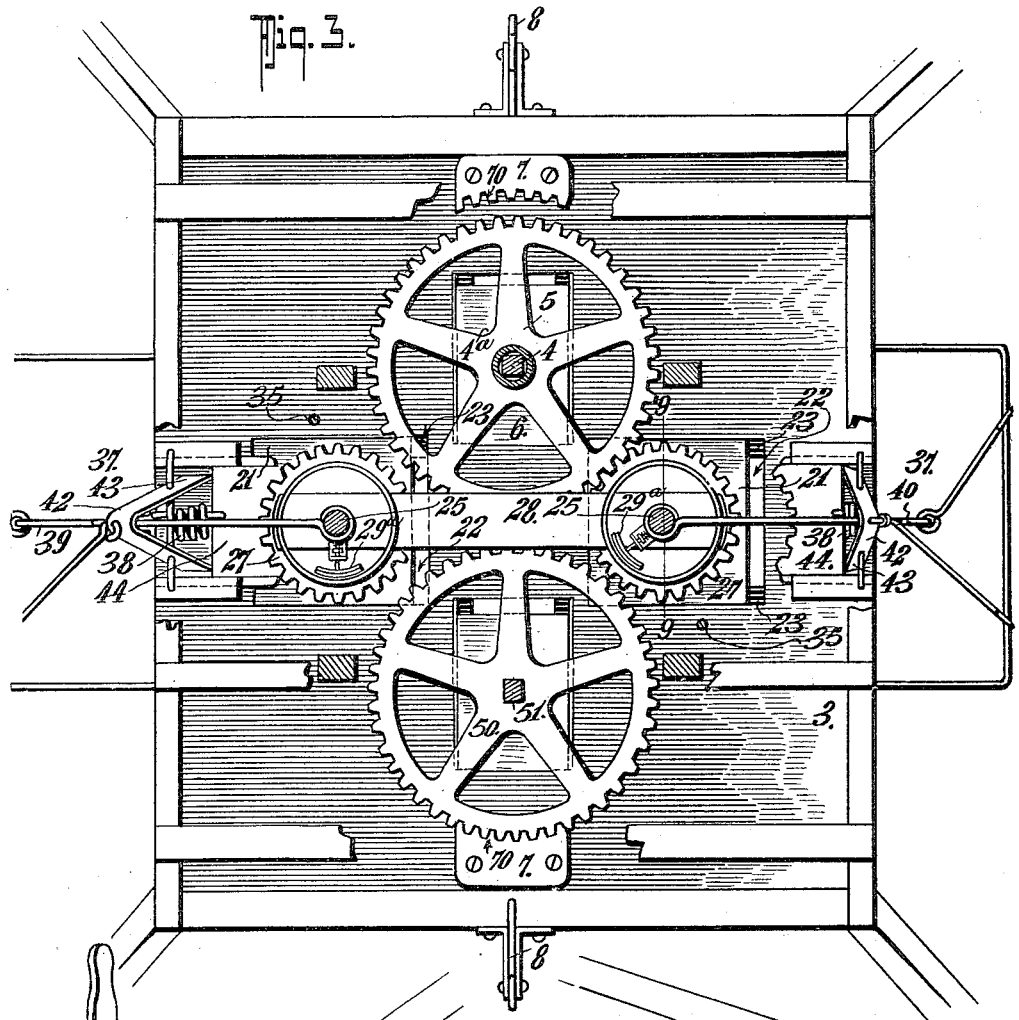

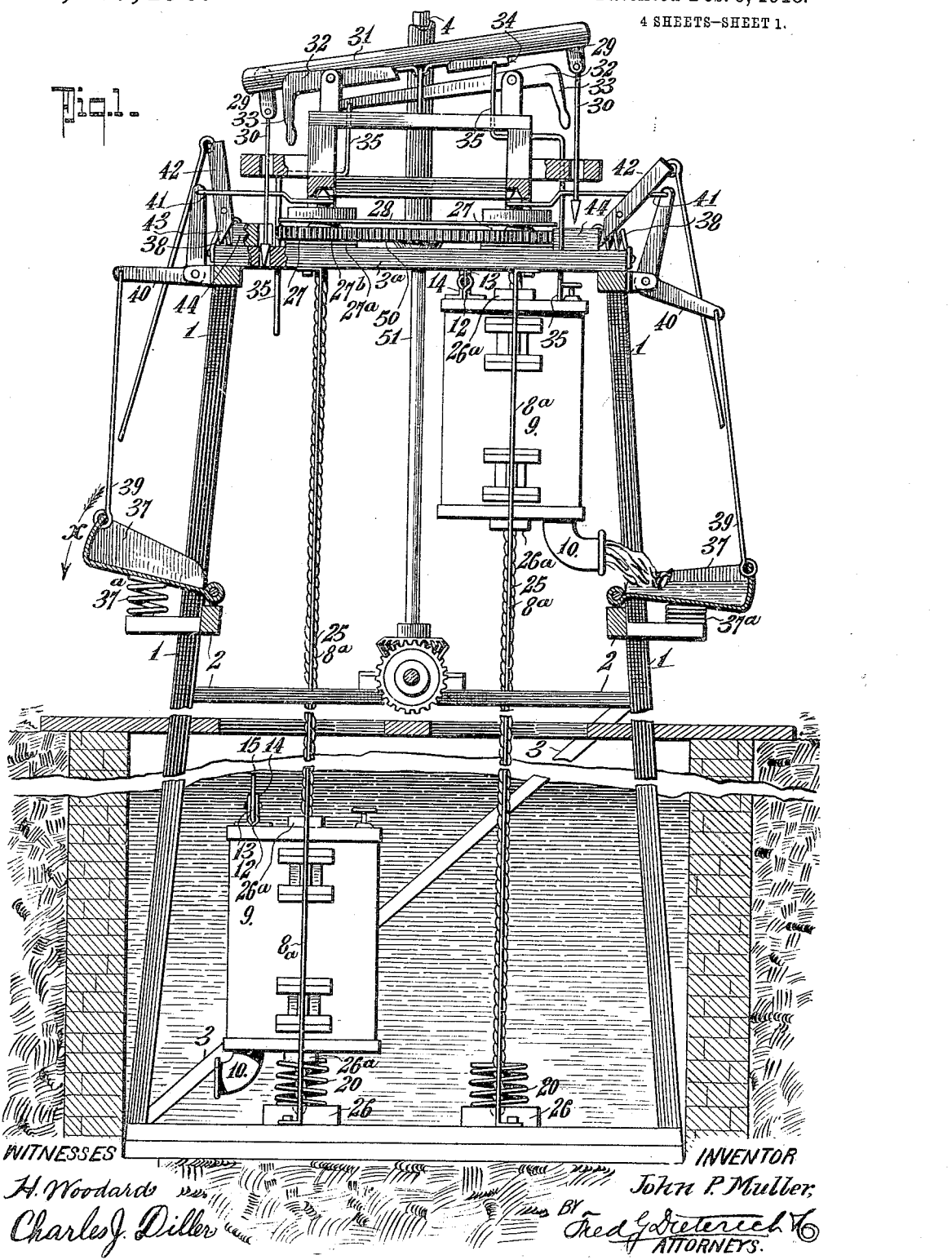

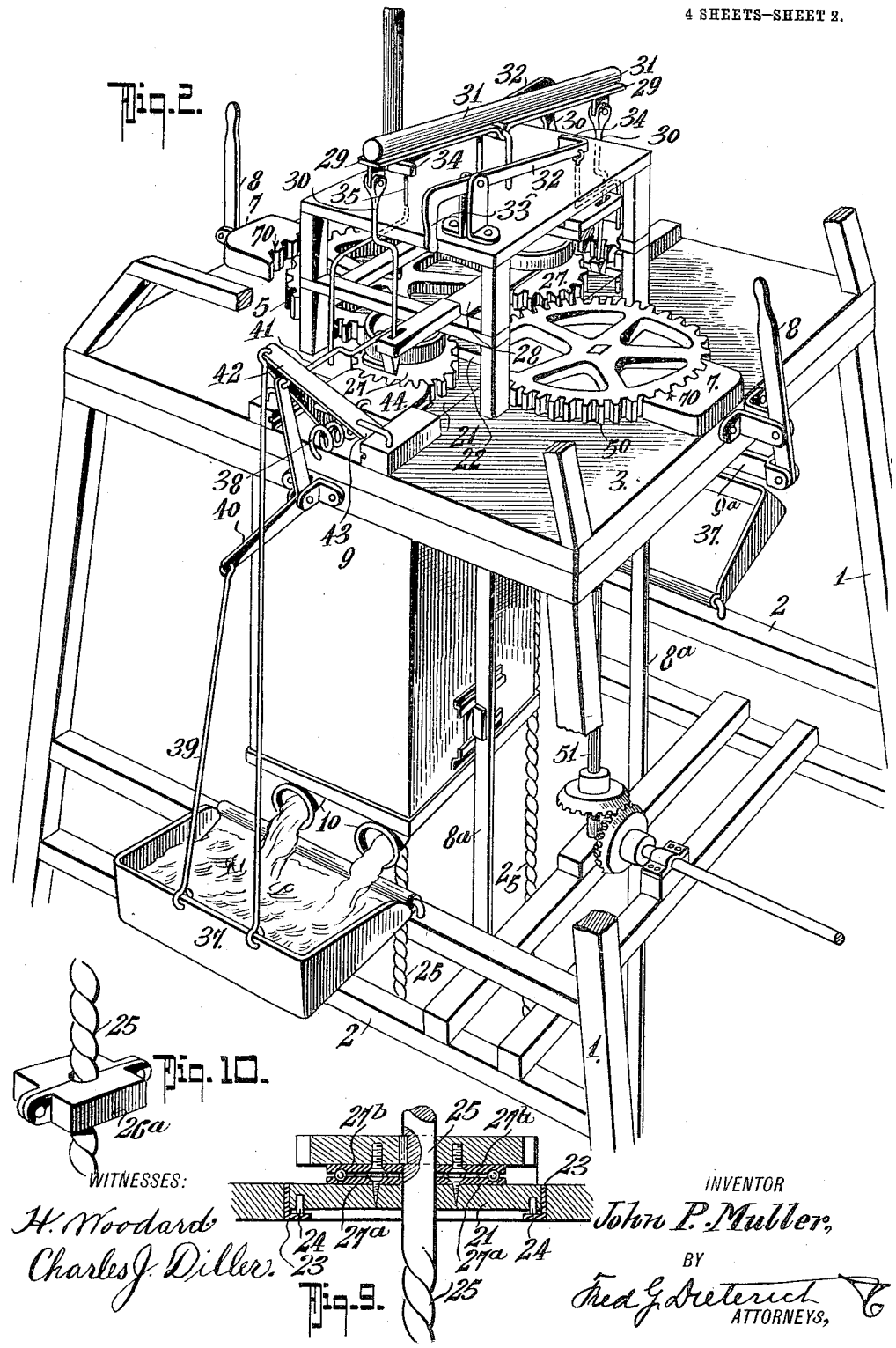

J. P. MULLER.
WATER HOISTING SYSTEM.
APPLICATION FILED SEPT. 15, 1913.
1,127,490.
Patented Feb. 9, 1915.
4 SHEETS—SHEET 4.
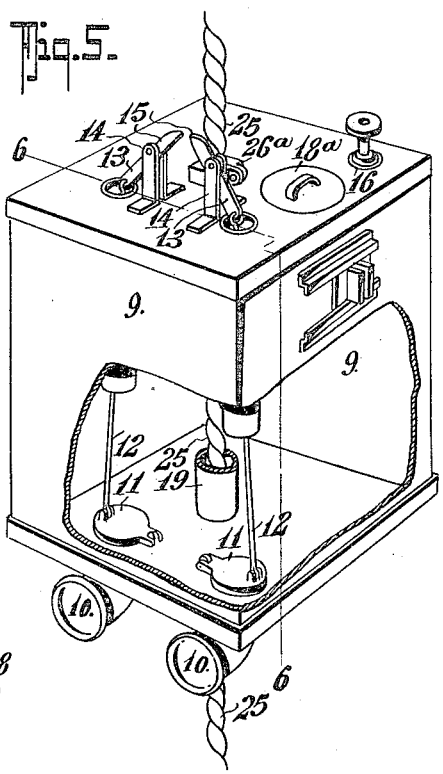
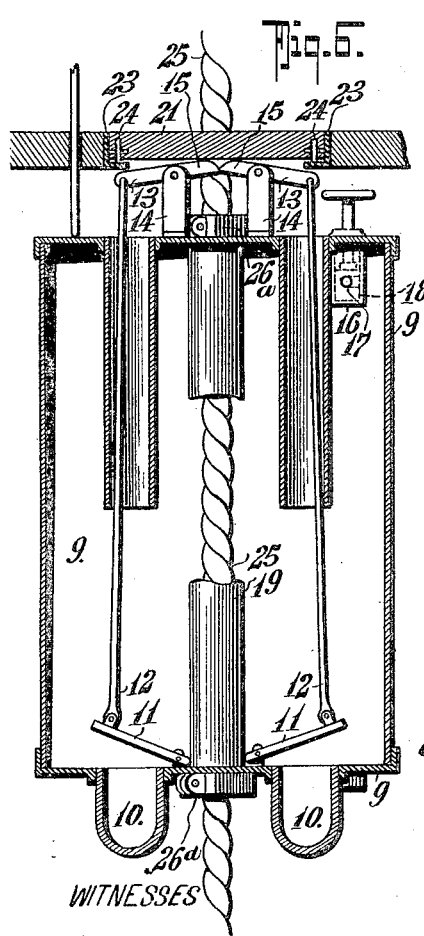
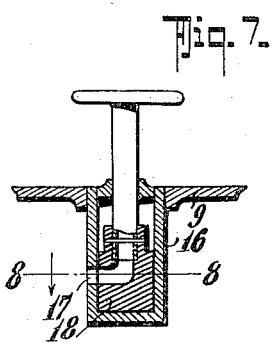
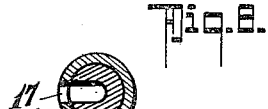
WITNESSES
H. Woodard
Charles J. Diller
INVENTOR
John P. Muller,
BY
Fred G. Dieterich
ATTORNEYS

UNITED STATES PATENT OFFICE.

JOHN PH. MULLER, OF SAN FERNANDO, CALIFORNIA.

WATER-HOISTING SYSTEM.

1,127,490.  Specification of Letters Patent.  Patented Feb. 9, 1915.

Application filed September 15, 1913. Serial No. 789,926.

*To all whom it may concern:*

Be it known that I, JOHN PH. MULLER, residing at San Fernando, in the county of Los Angeles and State of California, have invented certain new and useful Improvements in Water-Hoisting Systems, of which the following is a specification.

My invention relates to improvements in that class of water elevating systems or plants in which a main driving power is utilized for elevating the water holding elements that gather the water when lowered into a well, stream or other source of water supply, and in which mechanism is included for automatically releasing the said water holding or gathering elements after they have been lifted and discharged.

My invention primarily has for its purpose to provide an improved water hoisting plant or system of the general character stated of a simple and comparatively inexpensive construction in which is included a plurality of water lifts or holders, coöperatively connected with the main hoisting power and with each other and combined with an improved arrangement of tripping or shifting devices controlled by the rising water holders to thereby disconnect one of the said lifts or water holders from the main hoisting means as it reaches its maximum lift, and simultaneously throw into gear, or connection another of the said water elevating holders with the main driving power or hoisting means, to cause it to rise with its gathered water.

Another object of my invention is to provide a water hoisting means of the general type stated having means for raising the water comprising water carriers especially designed for being actuated by wind motor power and in which is also included tripping and shifting mechanisms automatically set by the rising water carrier and the water discharged therefrom for bringing into action the hoisting means for one water elevator or carrier as the hoisting means for another carrier is held stationary while the carrier lifted thereby gravitates back into the well or other water reservoir.

With other objects in view, all of which will be hereinafter explained, my invention embodies the peculiar construction and novel arrangement of the parts that constitute my complete water elevating system or plant, all of which will be hereinafter fully explained, specifically pointed out in the appended claims and illustrated in the accompanying drawings, in which:—

Figure 1 is a side elevation of my improved water elevating system or plant, one of the water carriers being shown at its uppermost or water discharging position and another of such carriers shown at its lowermost or water gathering position. Fig. 2 is a perspective view, on an enlarged scale, a portion of the power transmission gearing, including the automatically shifted devices that hold the opposing shiftable portions of the said gearing locked to their set positions, the means for actuating the said automatically shiftable devices being also shown. Fig. 3 is a top plan view of the power transmission gearing, the power or wind wheels and the shiftable device hereinafter referred to being omitted, the shaft for such wheels being shown in section. Fig. 4 is a perspective detail view of the shifting lever devices for throwing the main gear in and out of operative position. Fig. 5 is a perspective view of one of the water lifting tanks, parts being broken out to show the flap valves. Fig. 6 is a section of the same on the line 6—6 of Fig. 5. Fig. 7 is a detail sectional view of the rotary valve. Fig. 8 is a section on the line 8—8 of Fig. 7. Fig. 9 is a detail sectional view taken on the line 9—9 of Fig. 3. Fig. 10 is a detail perspective view of one of the nuts used on the water lifting tank.

In carrying out my invention, the operating mechanism is mounted upon a suitable framing formed of the upright beams 1, cross timbers 2 and suitable brace bars 3, and the said frame, when my invention is arranged for lifting the water from a well, as shown in Fig. 1, is suitably located above the well and includes portions that extend down into the well for supporting the water holding tanks or carriers, and the lower supports for the feed screws therefor. At the upper end, the framing supports a platform 3ª upon which is mounted the power transmission gearing presently explained.

4 designates a shaft hereinafter termed the air motor shaft. The shaft 4 is preferably square in cross section, its lower end being rounded and formed into a bearing for resting in the oil box 4ª mounted on a slidable carriage 6, mounted in the platform 3.

5 and 50 designate two main driven gears, one of which 5, is fixedly held on the lower end of the shaft 4 that is driven by the air motor, that is, the wind wheels. The other main driven gear is fixedly mounted on the upper end of a power driven shaft 51 to which power may be transmitted by horse, gas, or steam power, or by electrical energy, and it should be here stated that when the wind wheel driven gear 5 is in active position the other gear 50 is set at an inoperative position, see Fig. 3.

While the shaft 4 can be driven in one direction by any suitable motive power, I prefer to drive it by wind power and to that end, I employ a plurality of wind wheels, each of peculiar construction, as will hereinafter appear. These several wind wheels are removably mounted upon the shaft 4, so that when the wind blows too hard one or more of the said wheels may be removed and likewise when it is desired to develop power additional wheels may be added to the shaft.

For holding the air motor wheels out of use, a brake block 7 having a geared face 70 is mounted on the platform against which the large or master gear is shifted, which is done by a lever 8 pivotally mounted on one edge of the platform and connected by a link 9$^a$ with the carriage 6 on which the lower end of the motor shaft is supported, as clearly shown in Figs. 3 and 4.

In the present showing of my invention, I have shown two sets of water elevator mechanisms, and these are constructed alike and are so arranged that the operation of hoisting will be effected alternately, with respect to the tanks or water carriers presently described, or in other words, the several independent mechanisms are so arranged and adapted for being coöperatively connected with the main driving or master gear that the tanks or holders are alternately lifted, one rising as the other gravitates back into the well.

Coöperating with the several independent mechanisms stated, is a controlling device which includes a pair of locking members adapted for alternately engaging their respective water elevating mechanisms whereby to hold one of such mechanisms out of gear as its coöperating tank automatically descends and frees the other elevating mechanism to allow it to effect the raising of the water tank in coöperative connection therewith.

Referring now more particularly to Figs. 1 and 2 of the drawings, it will be noticed, two pairs of vertical guides 8$^a$—8$^a$ are provided and between each pair of such guides travels a tank or water carrier 9, and since the two tanks 9 are of like construction, a detailed description of one of such tanks will apply to both.

The tank 9, which preferably is made of galvanized iron is square in cross section when used in a well as shown, it being obvious that when used in a round well, the said tank is of semi-circular shape and when the water is to be hoisted from a river, or lake the said tank may be of any desired shape in horizontal section.

The tank 9 has two discharging outlets 10—10 and they are normally closed by the flap valves 11—11 with each of which connects a lift rod 12. The rods 12 extend up through openings in the top of the tank and each connects with one end of a rocking lever 13 fulcrumed on standards 14, and whose free ends are projected to form trippers 15, and are so positioned that when the tank reaches the limit of its elevated position, the said trippers 15 engage the under side of the platform and are thereby rocked to open the valves 11 to thereby permit of a quick discharge of the water from the tank.

16 designates a short pipe that extends down through the top of the tank and which has for its purpose to admit air into the tank and to provide for creating an air chamber in the top of the tank to float the said tank and keep it from becoming submerged in the bottom of the well from which the water is lifted. This pipe has an opening 17 near its upper end that is normally closed by a rotary valve 18 operable from the top of the tank. By providing a tube with an air passage and a rotary valve that coöperates with the said air passage as stated, it is apparent that the tank will but partly fill, say one-half, so long as the said air passage 17 is closed, and when it is desired to hoist a full tank it is only necessary to turn the valve 18 to open up the air passage through the tubular stem of the valve so as to permit all of the air in the tank to escape.

In case the air motor is used for working the water tank, and the wind power is not enough to raise a full tank of water, the operator by opening the vent valve 17 and tripping the flap valves 11, can rapidly draw off as much of the water from the tank as may be necessary to permit the wind motor to raise the balance. When the tanks are raised to the surface, the operator adjusts the rotary valve to close the air passage 17 and thereby puts the tank in shape to become but partly filled when lowered into the water to be lifted.

18$^a$ designates a manhole in the top of the tank and 19 a tube that extends centrally through the said tank, the purpose of which will presently appear.

20 designates buffer springs located on the base sills of the framing to prevent the tanks bumping on such sills when the water is low in the well.

21—21 designate trucks or carriages each mounted on four guide wheels. One of the trucks 21, is provided for each operating shaft that carries a lifting tank and each of the trucks has a limited longitudinal movement in a recess 22, in the platform the latter having suitable guides 23 on which the wheels 24 move. In each of the trucks is journaled the upper end of a quick-acting screw shaft 25, one of which is provided for each lifting tank, and each of which passes through the central tube 19 in its respective tank with its lower end journaled in bearings 26 on the base sills of the framing, as shown.

On each of the tanks is secured a pair of screw nuts 26ª, one above and one below each end of the tank for engaging their respective screw shafts and the said nuts are made of two sections to facilitate their application to the screw shafts, and are reinforced and secured to the tank, as shown. Each screw shaft carries a gear 27 near its upper end and the said gears are adapted for being alternately thrown into and out of mesh with the master gear on the motor shaft in the manner presently described. The two gears 27—27 are joined by a connecting bar 28 through which the upper ends of the screw shaft pass.

The gears 27—27 before referred to each run on ball bearings, the construction of which is shown in detail, see Fig. 9 by reference to which it will be seen the balls are inserted between two steel plates 27ª 27ᵇ, one of which 27ª is bolted on the truck and the other 27ᵇ bolted to the gear.

29ª designates a centrifugal brake device of any well known construction, one of which is coöperatively connected with the upper end of each screw shaft to control the speed thereof.

As before stated, the upper end of each screw shaft is journaled in a truck or carriage having a slight longitudinal movement, it being understood since both screw shafts are joined by a bar 28, the two trucks are caused to move together, the movement being such that the movement of one truck in one direction serves to bring the drive gear on one of the screw shafts into mesh with the main or master gear, and at the same time moves the gear on the other screw shaft out of mesh with the said master gear.

It should be also here stated that to effect a proper and positive operation of my invention, it is necessary that when the said screw shaft has been set that they be held locked to their set position until it is desired to shift or set in action a previously held up tank. For such purpose I have provided a controlling means that is automatically actuated by the alternately elevated water holders or tanks, the construction of which is best shown in Figs. 1 and 2, of the drawings, and the same comprise a horizontal lever arm 29, the ends of which are connected to locking members 30, the penetrating ends of which are wedge shaped for reasons presently explained. On the lever arm 29 is mounted a tube 31 in which plays one or more balancing ball weights adapted for holding the lever arm to its tilted positions, the said arm being fulcrumed midway its length. Coöperating with the balance lever arm are two tilting levers 32, one at each side of the arm 29, and disposed in parallelism therewith. Each lever 32 is fulcrumed near one end and has a handle portion 33 at such end and an inwardly bent lifter finger 34 that extends under the balance lever, as shown. Levers 32 may, when necessary, be tilted by pulling down the handle end, but when my water elevating system is operating under the wind motor power, the said levers are alternately tilted, automatically in the following manner. The lift finger end of each of the levers has a pendent rod 35 that extends down through the platform and in position to be engaged by the top of the tanks when they reach the limit of their upward stroke, and by reason thereof the fingers 34 tilt the balance, the ball weight facilitating the final or locking action of the said lever.

The locking ends of the balance lever arm 32 are adapted for passing down back of the carriage or truck at their respective ends, and in such a manner as to hold the gear of the truck thus engaged in mesh with the master driving gear during the operation of raising the filled pan up to the platform, it being understood that at the same time the locking end at the opposite end of the lever is elevated and out of engagement with the adjacent truck or carriage. The shifting of the screw shaft gears into mesh with the main or master gear is also done automatically by the rise and fall of the water tanks and the water that discharges therefrom and in a manner best explained, as follows: 37 designates what I term a water pan, that is hinged at its inner edge to one of the cross timbers of the frame and is normally swung to an upwardly tilted position by the buffer springs 37ª that engages the underside of the pan, see Fig. 1.

As is best shown in Figs. 1 and 2 the pan 37 is so positioned that the water as it leaves the lifted tank discharges onto the said pan and by its weight forces the pan down in the direction of the arrow X, and in so doing, the pan pulls on a chain 39, connected to the pan and causes the said chain to pull down on the bell crank lever 40 fulcrumed at the outer edge of the platform, which in turn, through the rod connection 41, joins with the screw shaft for the adjacent water tank and thereby pulls the gear on the said shaft, out of mesh with the main gear, simultaneously pulling the gear in the shaft at the opposite side into mesh with the said main gear to thereby start the other tank on its upward movement.

At the same time that the pan operates to shift the actuating gears, as stated, and particularly to throw the adjacent screw shaft out of gear, the down swing of the said pan also pulls on another crank lever 42 fulcrumed on the platform with its end portions 43 in engagement with a brake block 44 on the platform and normally pulled back by a coiled spring. Lever 42, when actuated by the pan, pushes the brake block 44 into contact with the adjacent gear on the screw shaft and holds the screw shaft stationary as long as the tank is emptying into the pan 37. When the water runs out of the pan 37, the cushion spring $37^a$ under the pan tilts it upwardly. The pusher spring 38 disconnects or pulls the brake block 44 from the gear shaft and thereby leaves the tank free to gravitate into the well to refill.

While the driving shaft 4 may be driven by any suitable power, I prefer to utilize motors in the nature of wind wheels, and for such purpose the said driving shaft is square in cross section, and is braced and guided by the uprights that rise from the top platform of the framing.

The wind wheels in my complete arrangement of water elevating means are constructed in the manner best shown in Figs. 10—11—12 and 13, of the drawings, by reference to which it will be noticed each wheel includes an extended axial sleeve or hub 45, square in cross section to slide upon the driving shaft on which it is held at the desired position on the said driving shaft by the clamp screw 46. Each wheel also includes a hub disk 47 from which radially project brace rods $47^a$ that join with the wheel rim 48.

49 designate flexible wire rods secured to the rim and projected vertically above and below the rim, and their free ends being bent inwardly and extended to the hub disk to which they are secured in any suitable manner, the said flexible rods having such shape whereby to form vertically disposed radial frames $49^a$ that taper in size from the rim toward the hub of the wheel. To the upper and lower members $50^a$—$50^a$ of the frame are secured the vanes of the wind wheel of triangular shape in plan view and double faced, one edge being open to thereby form pockets for catching the wind. The sails or vanes have hems 51—51 that take over the upper and lower members $50^a$ of the frame 49 and in such a manner that the vane or sail body may be quickly pulled inwardly toward the wheel hub and be drawn together to an inoperative position when it is desired to throw the wind wheel out of action and which may likewise be extended toward the wheel rim to open out the vanes or sails to the wind when it is desired to bring the wind wheel into action.

For shifting the sails or vanes to either their extended or contracted positions, the sails are connected to pull ropes in such a manner that by pulling the said ropes in one direction causes the several sails to draw up toward the hub of the wheel close toward the center of the wheel, to thereby put the sails or vanes out of operative position, and by pulling the said ropes in the other direction, the sails or vanes are extended toward the periphery of the wheel to their operative condition.

53—53 designate housing disks, one above and the other below the plane of the sails or vanes, and these are of such diameters that the center sail or vane portions can be drawn between and housed by the said disks when it is desired to put the motor or wind wheel out of operative condition.

By reason of forming the vanes or sails in the manner stated in case water is not needed and the farmer wants to stop the air motor, it is only necessary to go up to the top platform and pull the ropes that shift the vanes or sails to draw them in out of operative condition, it being understood the ropes are manipulated from the platform when it is desired to set the motor wheels in position for taking the wind.

While I have shown my improved motor wheel as adapted for operating the water tank elevating devices hereinbefore explained and shown in the drawings, the said wheel with but slight modifications or changes in details may be also utilized as a current motor.

From the foregoing description taken in connection with the accompanying drawings, the complete construction, the manner of operation and the advantages of my invention will be readily understood by those skilled in the art to which my invention relates.

What I claim is:

1. A water elevating means comprising the following elements in combination; a supporting frame, a plurality of vertically driven shafts mounted on the framing, a water collecting tank for each shaft, coöperating devices that connect the shafts and their tanks for elevating the tanks as the said shafts are rotated in a forward direction, a power driven shaft, power transmission mechanism that coöperates with the tank elevating shafts, means operable by the lifted tank for shifting the said mechanism to thereby disconnect the lifted tank shaft from the power shaft and simultaneously connect another of the said tank carrying shafts with the power shaft and allow the disconnected shaft to freely rotate as the lifted tank gravitates back to refill, the said tank having water intakes and valve outlets, and means on the tanks for operating the said valves as the tanks reach their elevated position, the said means including trippers automatically shifted by engaging a fixed part of the framing to thereby open the valve outlets.

2. A water elevating means comprising the following elements in combination; a supporting frame, a plurality of vertically driven shafts mounted on the framing, a water collecting tank for each shaft, coöperating devices that connect the shafts and their tanks for elevating the tanks as the said shafts are rotated in a forward direction, a power driven shaft, power transmission mechanism that coöperates with the tank elevating shafts, means operable by the lifted tank for shifting the said mechanism to thereby disconnect the lifted tank shaft from the power shaft and simultaneously connect another of the said tank carrying shafts with the power shaft and allow the disconnected shaft to freely rotate as the lifted tank gravitates back to refill, the said tank having water intakes and valved outlets, means on the tanks for operating the said valves as the tanks reach their elevated position, the said means including trippers automatically shifted by engaging a fixed part of the framing to thereby open the valve outlets, the aforesaid transmission shifting means being operated by the water discharging from the lifted tanks.

3. A water elevating means comprising the following elements in combination; a supporting frame, a plurality of vertically driven shafts mounted on the frame, a water collecting tank for each shaft, coöperating devices that connect the shafts and the tank for elevating the shafts as the said shafts are rotated in a forward direction, a power driven shaft, power transmission mechanism that coöperates with the tank elevating shaft, means operable by the lifted tank for shifting the said mechanism to thereby disconnect the lifted tank shaft from the power shaft and simultaneously connect another of the said tank carrying shafts with the power shaft and allow the disconnected shaft to freely rotate as the lifted tank gravitates back to refill, the said tank having water intakes and valve outlets, means on the tanks for operating the said valves as the tanks reach their elevated position, the said means including trippers automatically shifted by engaging a fixed part of the frame to thereby open the valve outlets, the aforesaid transmission shifting means being operated by the water discharging from the lifted tanks, and further means for locking the transmission mechanism to its shifted position, the said means being operated by the tank as it reaches the limit of its lifted movement.

4. A water elevating means comprising the following elements in combination; a supporting frame, a plurality of vertically driven shafts mounted on the framing, a water collecting tank for each shaft, coöperating devices that connect the shafts and the tank for elevating the shafts as the said shafts are rotated in a forward direction, a power driven shaft, power transmission mechanism that coöperates with the tank elevating shaft, means operable by the lifted tank for shifting the said mechanism to thereby disconnect the lifted tank shaft from the power shaft and simultaneously connect another of the said tank carrying shafts with the power shaft and allow the disconnected shaft to freely rotate as the lifted tank gravitates back to refill, the said tank having water intakes and valve outlets, means on the tanks for operating the said valves as the tanks reach their elevated position, the said means including trippers automatically shifted by engaging a fixed part of the frame to thereby open the valve outlets, the aforesaid transmission shifting means being operated by the water discharging from the lifted tanks, further means for locking the transmission mechanism to its shifted position, the said means being operated by the tank as it reaches the limit of its lifted movement, and a brake device for temporarily holding the shaft of the lifted tanks from revolving.

5. In a water elevating means of the character described, vertically disposed driven shafts, a tank mounted on each of the said shafts, coöperative connections between the said tanks and their respective shafts arranged as the said shafts rotate in one direction for feeding the tanks upwardly, each of the said tanks including an intake tube through the top that extends down into the tank, an air vent valve, a valve outlet, the valves of which include pusher rods that extend off the top of the tank and crank levers mounted on the top of the tank for each of the said rods adapted for engaging with a fixed part of the frame to lift the said rods for the purposes described.

6. In a water elevating means of the character described, a plurality of vertically disposed driven shafts, a water collecting tank for each of the said shafts, coöperating devices that connect the shafts and the tanks for elevating the tanks as the shafts are rotated in a forward direction, a power driven shaft, power transmission mechanism for coöperating with the tank elevating shafts, means operable by the lifted tank for shifting the said mechanism to thereby disconnect the lifted tank shaft from the power shaft, said tanks having water intakes and valve outlets automatically actuated means on the tanks for opening the said valve outlets as the tanks reach their lifted position.

7. In a water elevating means, a supporting framing in which is included a plurality of sets of pairs of vertical guides, a water collecting and discharging tank vertically movable between each pair of the said guides, a quick-acting screw shaft for each of the tanks, the latter having screw nuts for engaging their respective screw shafts, each tank having an intake and valve outlet, and means on each tank for opening its outlet, a power shaft, transmission mechanism that connects the power shaft and the screw shaft, and means for shifting the said transmission mechanism to thereby move one of the tank shafts into gear and the other tank shaft out of gear with the said transmission mechanism.

8. In a water lifting means, a suitable framing, a pair of screw shafts mounted in the said framing; said framing including a platform at the upper end, a carriage for each of the screw shafts movable in the said platform and through which the screw shafts pass, each of the said screw shafts having a driving gear located above the platform, a connection that joins the upper ends of the two shafts, a power shaft mounted on the platform, a driving gear on the said shaft at all times in mesh with either end of the gears on the screw shaft, a crank lever connected with each screw shaft, a second crank lever rockably mounted upon the framing adjacent the upper end of each screw shaft, a slidable brake for each of the said second crank levers normally held out of contact with the driven gears on their respective adjacent screw shafts, a water pan pivoted on the framing adapted for coöperating with each of the tanks, flexible connections between the bell crank levers, the said last mentioned crank levers and the said water pan the latter being arranged to be depressed by the outflow of the water from the lifted tank whereby to first shift the gear on the screw shaft for the discharging tank out of mesh with the power transmission gear and then apply a brake device for holding the tank at its water discharging position until it is emptied.

9. In a water lifting means, a suitable framing, a pair of screw shafts mounted in the said framing; said framing including a platform at the upper end, a carriage for each of the screw shafts movable in the said platform and through which the screw shafts pass, each of the said screw shafts having a driving gear located above the platform, a connection that joins the upper ends of the two shafts, a power shaft mounted on the platform, a driving gear on the said shaft at all times in mesh with either one of the gears on the screw shaft, a crank lever connected with each screw shaft, a second crank lever rockably mounted upon the framing adjacent the upper end of each screw shaft, a slidable brake for each of the said second crank levers normally held out of contact with the driven gears on their respective adjacent screw shafts, a water pan pivoted on the framing adapted for coöperating with each of the tanks, flexible connections between the bell crank levers and the said last named crank levers and the pan, said water pan being arranged to be depressed by the outflow of the water from the lifted tank whereby to first shift the gear on the screw shaft for the discharging tank out of mesh with the power transmission gear, then applying a brake to the said gear that is thrown out of mesh with the transmission gear, and locking mechanism including a balance arm having a locking member at each end, a pair of pivoted tripping levers including members that project down into the path of the tank as it is elevated to thereby tilt the balance lever to move either of the said locking members into a locked engagement with the carriages that support the upper ends of the screw shafts to hold the gear that is moved into mesh with the transmission in a locked engagement therewith.

JOHN PH. MULLER.

Witnesses:
 HENRY GLENN,
 JOSEPH B. JONES.

Copies of this patent may be obtained for five cents each, by addressing the "Commissioner of Patents, Washington, D. C."